Patented Aug. 15, 1944

2,356,075

UNITED STATES PATENT OFFICE 2,356,075

ACRYLONITRILES AND SUBSTITUTED ACRYLONITRILES AS FUMIGANTS

Vartkes Migrdichian, Greenwich, Conn., assignor to American Cyanamid Company, New York, N. Y., a corporation of Maine No Drawing. Application December 9, 1939.
Serial No. 308,389

7 Claims. (Cl. 167—22)

This invention relates to pest control agents and more particularly to those belonging to a class of compounds adapted to the fumigation of enclosed spaces for the eradication of insects and allied pests and to methods of fumigation therewith.

I have discovered that valuable pest control properties are exhibited by the group of organic chemical compounds having the following structural formula:

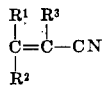

in which $R^1$, $R^2$ and $R^3$ represent hydrogen, an aliphatic hydrocarbon radical or a halogen substituted aliphatic hydrocarbon radical. This group of chemical compounds includes a large number of substances of which the following are typical: acrylonitrile, $\beta$-methylacrylonitrile, $\beta,\beta$-dimethylacrylonitrile, $\beta$-ethylacrylonitrile, $\beta$-isopropylacrylonitrile, $\beta$-isobutylacrylonitrile, $\alpha$-methylacrylonitrile, $\alpha$-ethylacrylonitrile, $\alpha$-chloromethylacrylonitrile, and $\alpha$-bromomethylacrylonitrile.

Acrylonitrile is particularly suited to pest control by fumigation methods as it has a high vapor pressure at ordinary temperatures. The substitution of halogens or radicals of other members of the aliphatic hydrocarbon series has a tendency to raise the boiling point of the resultant compound. Such compounds as have a reasonable vapor pressure at ordinary temperatures or may be vaporized with reasonable application of heat are still suitable as fumigants, while the higher substitution products are valuable contact insecticides.

Where used as fumigants, the compound either alone or in admixture with others is applied, for example, as by atomizing or vaporizing with or without heat into the enclosure a measured quantity of the material either at atmospheric pressure or at reduced air pressures. These compounds may also be introduced into the space to be fumigated in the form of impregnated solids such as kieselguhr or cellulosic board or other absorbent bodies carrying the compounds. They may also be used in the form of solutions or emulsions, from which they are subsequently vaporized. When used as contact insecticides, they may be sprayed directly on the life to be killed.

The invention will be illustrated in greater detail by the fumigation tests performed on various insects, listed in the following table:

| Insect | Fumigant | Dosage oz./1000 cu. feet | Exposure, hours | Per cent kill |
|---|---|---|---|---|
| Flour beetle | Acrylonitrile | 4 | 4 | 98 |
| Do | do | 5 | 4 | 100 |
| Rice weevil | do | 1 | 4 | 60 |
| Do | do | 2 | 4 | 100 |
| Tobacco beetle | do | 2 | 4 | 88 |
| Do | do | 3 | 4 | 100 |
| Cockroach | do | 1 | 4 | 100 |
| Carpet beetle | do | 6 | 4 | 60 |
| Do | do | 8 | 4 | 100 |
| Aphis rumicis | do | 10 | 16 | 100 |
| Citrus red spider | do | 10 | 1 | 87 |
| Do | do | 10 | 16 | 100 |
| Resistant Calif. red scale | do | 10 | 1 | 70 |
| Do | do | 10 | 16 | 100 |
| Citrus mealy bug | do | 10 | 16 | 100 |
| Southern army worm | do | 10 | 16 | 100 |
| Rice weevil | $\alpha$-Methylacrylonitrile | 8 | 4 | 84 |
| Do | do | 12 | 4 | 92 |
| Do | $\alpha$-Ethylacrylonitrile | 12 | 4 | 85 |
| Do | do | 24 | 4 | 94 |
| Flour beetle | do | 20 | 4 | 91 |
| Do | do | 24 | 4 | 100 |
| Rice weevil | $\beta$-Ethylacrylonitrile | 8 | 4 | 92 |
| Do | do | 12 | 4 | 100 |
| Do | $\alpha$-Chloromethylacrylonitrile | 0.5 | 4 | 100 |
| Flour beetle | do | 1 | 4 | 11 |
| Do | do | 2 | 4 | 100 |

Among these useful compounds acrylonitrile, as a typical example, presents numerous advantages in the fumigation field as compared to known fumigants. It possesses insecticidal power to a high degree and is sufficiently volatile to establish the proper concentration under the conditions encountered. It is non-corrosive and does not develop high pressure in the container under usual conditions, hence it may be stored and shipped in ordinary vessels. It does not possess an objectionable odor and will not leave an undesirable odor in goods fumigated therewith. It has a lower rate of toxicity for man and warm blooded animals as compared with hydrocyanic acid, a fumigant extensively used for fumigation, and is a safer fumigant for this class of life in that a dosage sufficient to cause unconsciousness in the subject is ordinarily not fatal, which cannot be said of HCN poisoning.

The following table illustrates the effectiveness of acrylonitrile as against other typical fumigants:

| Fumigant | Minimum lethal dose for 4-hr. exposure oz./1,000 cu. feet | |
|---|---|---|
| | Rice weevil | Confused flour beetle |
| Acrylonitrile | 2 | 5 |
| Methyl bromide | 4 | 15 |
| Ethylene oxide | 12 | 20 |
| Chlorpicrin | 4 | 8 |

In utilizing the fumigants of this invention, it is possible to avoid "protective stupefaction," a characteristic which is encountered when insects, of which the active rice weevil is typical, are exposed to hydrocyanic acid gas. Sorption experiments have shown that insects of this type take up considerable quantities of hydrocyanic acid gas during the first one or two minutes of exposure, and thereafter become stupefied with a result that the gas is sorbed at a very low rate and the kill in many instances is by no means satisfactory. This protective characteristic has been explained by assuming that the first rapid uptake of hydrocyanic acid gas by the active insect occurs in the tracheal tubes, and that after the insect becomes stupefied, the fumigant is prevented from entering these tubes by means of a closing mechanism.

These compounds may be used alone or in admixture with other fumigants, insecticides or diluents, or with compounds which render the liquid or the vapors given off from the liquid non-inflammable and thus completely eliminate the fire hazard.

While the invention has been described with specific reference to particular embodiments, it is to be understood that it is not to be limited thereto, but is to be construed broadly and restricted solely by the scope of the appended claims.

I claim:
1. An insecticide comprising α-chloromethylacrylonitrile.
2. A method of fumigating insects which comprises vaporizing into the space to be fumigated a compound having the formula:

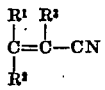

in which $R_1$, $R_2$ and $R_3$ chosen from the group consisting of hydrogen, an aliphatic hydrocarbon radical of less than five carbon atoms and a halogen substituted aliphatic hydrocarbon radical of less than five carbon atoms.

3. A method of fumigating insects which comprises vaporizing acrylonitrile into the space to be fumigated.

4. A method of fumigating insects which comprises vaporizing β-ethyl acrylonitrile into the space to be fumigated.

5. A method of fumigating insects which comprises vaporizing α-chloromethyl acrylonitrile into the space to be fumigated.

6. A method of fumigating insects which includes establishing in the space to be fumigated a concentration of acrylonitrile in substantially the proportion of at least one ounce per 1000 cubic feet.

7. A method of controlling insects which includes the step of exposing the same to a toxic amount of a compound having the formula:

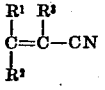

in which $R^1$, $R^2$ and $R^3$ are chosen from the group consisting of hydrogen, an aliphatic hydrocarbon radical and a halogen substituted aliphatic hydrocarbon radical.

VARTKES MIGRDICHIAN.